United States Patent [19]

McColl

[11] Patent Number: 5,023,605
[45] Date of Patent: * Jun. 11, 1991

[54] PATTERNED TRANSDUCER APPARATUS FOR CORRECTING SPURIOUS SIGNALS IN SAID DEVICES

[75] Inventor: James R. McColl, Concord, Mass.

[73] Assignee: GTE Laboratories, Inc., Danvers, Mass.

[*] Notice: The portion of the term of this patent subsequent to Jul. 31, 2007 has been disclaimed.

[21] Appl. No.: 467,112

[22] Filed: Jan. 19, 1990

Related U.S. Application Data

[63] Continuation of Ser. No. 276,072, Nov. 25, 1988, Pat. No. 4,945,354.

[51] Int. Cl.⁵ .................................................. G06F 7/00
[52] U.S. Cl. .............................. 340/825.31; 307/10.5; 310/313 R; 310/313 D
[58] Field of Search ...................... 340/825.31, 825.34; 310/313 R, 313 B, 313 C, 313 D; 333/194, 196; 307/10.2, 10.3, 10.5, 10.6

[56] References Cited

U.S. PATENT DOCUMENTS

| | | | |
|---|---|---|---|
| 3,573,673 | 4/1971 | DeVries | 333/194 |
| 4,006,438 | 2/1977 | Bennett | 310/313 R |
| 4,066,985 | 1/1978 | Kung | 310/313 R |
| 4,462,011 | 7/1984 | Ward | 310/313 R |

FOREIGN PATENT DOCUMENTS

| | | | |
|---|---|---|---|
| 0140618 | 5/1985 | European Pat. Off. | 310/313 D |
| 0019634 | 2/1979 | Japan | 333/194 |
| 2160048 | 12/1985 | United Kingdom | 333/194 |
| 2168869 | 6/1986 | United Kingdom | 333/194 |

Primary Examiner—Donald J. Yusko
Assistant Examiner—Peter Weissman
Attorney, Agent, or Firm—Salzman & Levy

[57] ABSTRACT

The invention features a theft resistant security system for motor vehicles. The system has receptacle with a coupling coil. A SAW (surface acoustical wave) device associated with the receptacle for relative movement thereto is also provided. The SAW device has a code and its own coupling coil for interaction with the receptacle coupling coil. A testing mechanism is connected to the receptacle for determining whether the code of the SAW device is valid for operation of the motor vehicle. Problems of crosstalk and wave reflection may produce spurious code pulses in systems of this type. The invention provides techniques for eliminating or reducing these unwanted pulses.

17 Claims, 7 Drawing Sheets

PATTERNED TRANSDUCER APPARATUS FOR CORRECTING SPURIOUS SIGNALS IN SAID DEVICES

This is a continuation of application Ser. No. 276,072 filed Nov. 25, 1988 now U.S. Pat. No. 4,945,354.

RELATED APPLICATION

This application is related to co-pending patent application Ser. No. 227,282; filed Aug. 2, 1988, titled CODED SURFACE ACOUSTICAL WAVE (SAW) MOTOR VEHICLE SECURITY DEVICE and is meant to incorporate by way of reference all of the teachings and description therein.

FIELD OF THE INVENTION

The invention relates to automotive antitheft devices utilizing surface acoustic wave (SAW) devices, and more particularly to automotive antitheft SAW devices having corrective features for eliminating and/or reducing spurious signal detection.

BACKGROUND OF THE INVENTION

The invention pertains to a surface acoustic wave (SAW) device which forms part of an antitheft automotive system, as described in the aforementioned patent application Ser. No. 227,282. The previous application describes a SAW device comprising a coded SAW delay line and attached coil antenna that is embedded in or integrally formed with an otherwise conventional mechanical ignition key.

A coil mounted around the lock cylinder mounted in the steering column provides a brief radio frequency pulse. This pulse is picked up by the coil antenna, which excites a surface acoustical wave on the SAW delay line. After a time delay, the antenna is re-excited by a coded set of pulses determined by the arrangement of interdigital transducers (IDT) on the SAW delay line. These transponded pulses are picked up by the original coil, and processed electronically to ensure that the code on the SAW delay line matches a predetermined code. If there is no correct match, this is interpreted as an unauthorized intrusion and further action is inhibited.

A major problem that is encountered with SAW devices of this type is the existence of spurious signals. In the present context, the term spurious signal means unintended transponded signals that interfere with the correct code interpretation. These spurious signals arise from two sources: (1) crosstalk; and (2) double transit interference.

Crosstalk refers to output pulses created by launching and receiving SAWs within the subIDT structure, e.g., a SAW launched by a subIDT and received by another subIDT. Double transit interference refers to output pulses created by two SAW transits. For example, a SAW launched by the main IDT and received by a subIDT contributes to an output pulse; this output pulse excites the coil antenna as desired. However, acoustic energy is also reflected from a subIDT, and redirected and picked up by other subIDTs as well as the main IDT.

An initially developed coded SAW delay line based system for electronic labeling provided a means to reduce crosstalk spurious pulses by arranging the SAW delay line so that the SAW transit time from the main IDT to the first subIDT exceeded the total transit time from the first subIDT to the last subIDT.[1] In this way, all of the crosstalk spurious pulses arrived before the main, wanted, code-bearing pulses. It was recognized that it was important to provide additional means for suppressing spurious signals.[2] Means were devised using parallel acoustic wave paths to achieve this suppression.

Other means included the use of phase coding. The utilization of microwave frequency and decoding of a phase coded signal, however, requires complex and expensive electronics.

In an automotive antitheft system it is most important to reduce costs to a minimum. To realize this objective, the rf frequency should be below 50 MHz, so that low cost electronic components, currently available for other consumer devices, can be employed.

However, when the rf frequency is reduced below 50 MHz, spurious signals cannot be eliminated effectively by utilizing either parallel acoustic wave paths or phase coding techniques.

The restrictions on frequency, chip size and coding method (amplitude encoding) imposed by the automotive antitheft system with spurious signal elimination at the lower frequency leads to an unreasonably low number of available codes.

The present invention relaxes the previous requirement that the SAW device transit time from the main IDT to the first tap subIDT exceed the transit time from first subIDT to the last subIDT, thus increasing the number of available code bits. This provides a greater number of codes for an effective automotive antitheft system, but requires a new technique for eliminating or reducing spurious signals.

The current invention uses the following new techniques to eliminate spurious signals:
(1) time narrowing;
(2) time shifting;
(3) time spreading; and
(4) cancellation.

Time narrowing uses narrower subIDTs with respect to the main IDT, thus diminishing crosstalk signals.

Time shifting utilizes the addition of a half code period to the spacing between the main IDT and the subIDTs, thus shifting the crosstalk signals between recognized signal centers.

Time spreading operates to shape the pattern of electrode overlaps within the subIDTs in order to spread crosstalk signals over a longer period of time, thus weakening these spurious signals.

Cancellation of the crosstalk signals is accomplished by adding additional IDTs, which generate additional signals of equal amplitude and time, and opposite phase, relative to the crosstalk signals.

Also contemplated by the present invention is the reduction or elimination of reflected acoustic energy resulting in double transit interference. This is accomplished by connecting an external resistor across the SAW device coil or by terminating the detection coil with a resistor.

Also additional IDTs can be connected to the bus bars which do not interact acoustically with the code-generating IDTs by the utilization of an acoustic absorber.

SUMMARY OF THE INVENTION

In accordance with the present invention, there is provided a theft resistant security system for motor vehicles. The system has a receptacle with a coupling coil. A SAW device associated with the receptacle for relative movement therein is also provided. The SAW device has a code and its own coupling coil for interaction with the receptacle coupling coil. A testing mechanism is connected to the receptacle for determining whether the code of the SAW device is valid for operation of the motor vehicle.

The SAW device comprises a substrate having a plurality of tap transducers serially disposed thereon. The tap transducers are spaced-apart from each other, and each tap transducer position defines a bit of the code.

A first tap transducer in the series is disposed no closer than a third bit position with respect to a leading transducer. Each tap transducer is operatively connected to the launch transducer by a pair of bus bars. The coupling coil is connected to the bus bars.

In order to reduce crosstalk, at least one, but preferably all of the tap transducers have a relatively narrower electrode width than the leading transducer.

Also, the first tap transducer in the series can be disposed a fractional part of a bit length further than a given length of bits from the leading transducer. This displaces as well as weakens any crosstalk pulse signal.

Another way of reducing crosstalk is provided by designing an electrode gap pattern of one transducer opposite to the direction of the electrode gap patterns of the other two transducers.

Yet another method of reducing crosstalk involves phasing at least one tap transducer oppositely to a crosstalk signal pulse of equal amplitude.

Double wave transit interference is reduced by increasing the load conductance. This is accomplished by adding resistance to either code-production or detection coupling coils.

Also, tap transducers that do not interact with the other tap transducer can be utilized for the purpose. Such tap transducers can include an acoustic absorber.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Generally speaking, the invention features a coded SAW device for automotive antitheft systems that is corrected for crosstalk and reflective signals. The device and detection circuitry is described in aforementioned U.S. patent application Ser. No. 227,282.

For purposes of brevity, the teachings and description of the aforesaid application are incorporated herein by reference.

Figure 1:
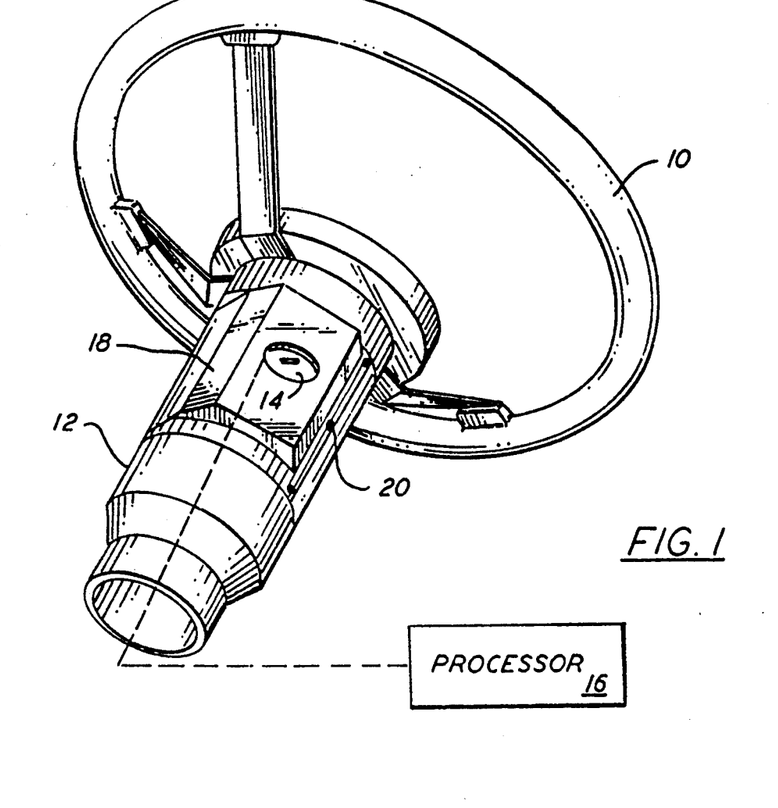
FIG. 1 is a perspective view of a steering column, steering wheel and computer processor.

Referring now to FIG. 1, there are shown a conventional steering wheel 10 and steering column 12, as can be found in most motor vehicles and especially in automobiles. Connected to an ignition switch 14, hereinbelow described in greater detail, is a microprocessor 16. Many motor vehicles have electronic brains or computer processors such as that shown as reference numeral 16, used to regulate the electrical, mechanical and chemical systems used in the vehicles. Often, general purpose computers, a network thereof, or microprocessor-based electronic systems are used for the various functions. For example, a computer processor in an automobile may be used to regulate gas flow, to signal malfunctions in brake systems, to indicate the level of oil in the crankcase, to adjust internal temperature and the like.

A collar housing 18 is shown mounted on the steering column 12 by means of screws 20, although any suitable mounting means may be used for this purpose. The collar 18 houses a coupling coil or antenna, not shown, the use of which is explained hereafter. Certain circuitry may also be contained within the collar 18.

Figures 2, 4, 6:
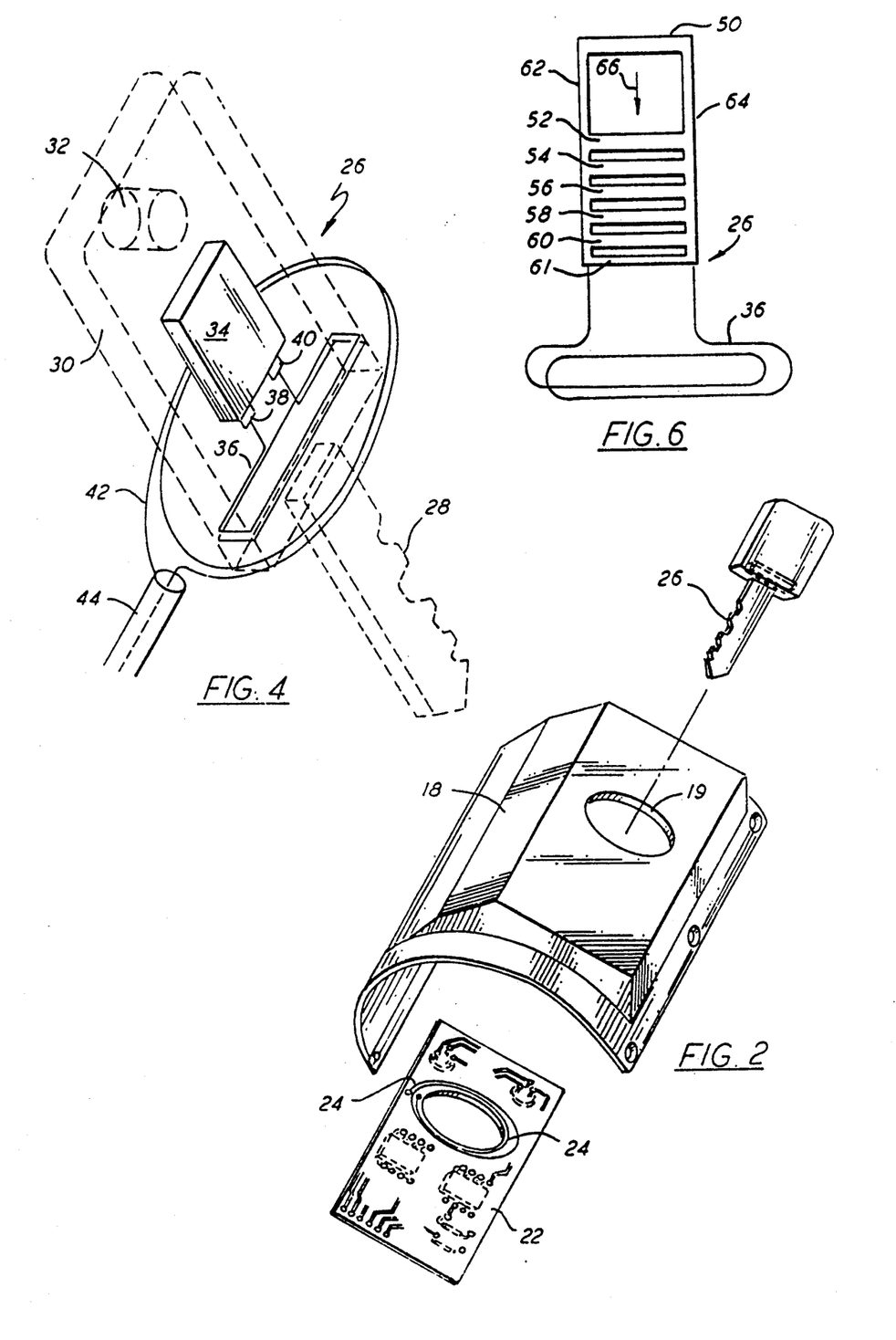
FIG. 2 is an exploded perspective assembly view of the preferred embodiment of the present invention.
FIG. 4 is a schematic representation of a key with a SAW device inserted in proximity to a coupling coil.
FIG. 6 is a schematic representation of a SAW device shown connected to a coupling coil.

Referring now also to FIG. 2, there is shown a perspective assembly view of the preferred embodiment of the present invention. The collar housing 18 has a circular aperture 19 cut therein. A printed circuit board or card 22 is housed by the collar housing 18 and encircles the ignition switch, not shown. The printed circuit board 22 has components mounted thereon that function as a receiver in cooperation with a SAW device as hereinbelow described. Encircling the printed circuit board aperture is a coupling coil 24, the use of which is described in greater detail hereinbelow.

An ignition key is shown generally at reference numeral 26. The key 26 is adapted to be inserted through the collar aperture 19 and into the ignition switch, not shown. It should be noted that a conventional ignition key with a coded mechanical blade is not necessarily a requirement of the present invention.

Figure 3:
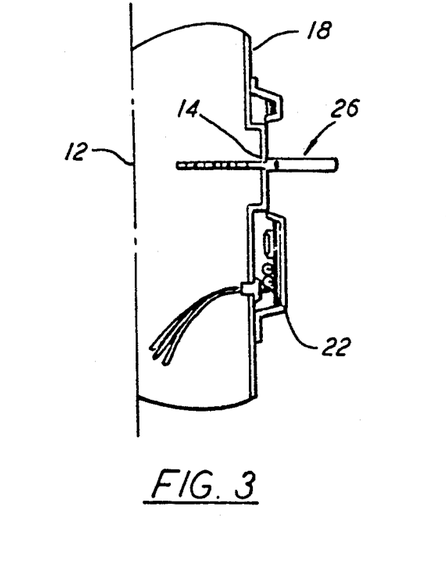
FIG. 3 is a cross sectional view of a key inserted in an ignition switch.

Referring now also to FIG. 3, there is shown a cross sectional side view of an ignition key 26 inserted into the ignition switch 14.

Referring now also to FIG. 4, there is shown a schematic representation of an ignition key 26, the outline of which is shown in phantom. In the preferred embodiment, the key 26 has a longitudinal mechanical protuberance 28, as do most conventional ignition keys. This longitudinal section 28 is preferably fabricated of metal and is mechanically coded to fit a particular ignition key lock, not shown.

Connected to the metal protuberance 28 is a key handle 30. The handle 30 has an aperture 32 adapted to fit onto conventional key holders and key rings, not shown. The handle 30 can be rubber, plastic or any other suitable nonmetallic material. Plastic is preferred. Imbedded in the handle 30 is a surface acoustical wave (SAW) device 34. Connected to the SAW device 34 is a coupling coil or antenna 36. The coil 36 forms a continuous loop connected to the SAW device 34 at ports 38 and 40 and is disposed perpendicular to the major axis of the key 26 and the SAW device 34.

Also shown in FIG. 4 is a second coupling coil or antenna 42, which encircles the SAW device coil 36, but is not connected thereto. The second coil 42 is connected to a sensor, not shown, by means of an electrically conductive cable 44. It can be seen that the key 26 and SAW device coil 36 are adapted to move relative to the second coil 42.

Figure 5:
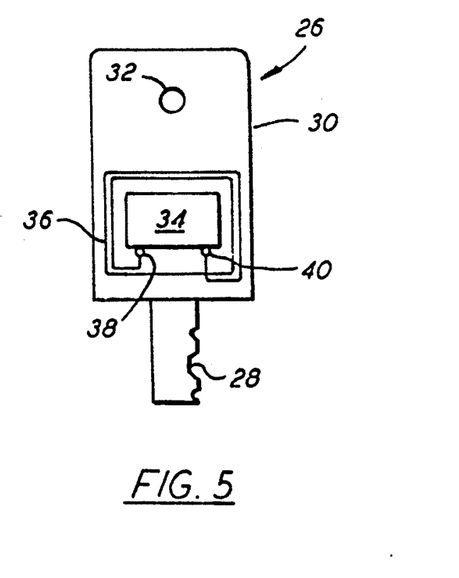
FIG. 5 is a schematic representation of a key with a SAW device imbedded therein.

Referring now also to FIG. 5, there is shown another cross sectional view of an ignition key in accordance with the present invention. In this embodiment, the SAW device coil 36 is disposed parallel to the major plane of the key 26 and of the SAW device 34. This coil configuration can also be used with appropriate modification to the sensor coil 42 (FIG. 4).

Referring now also to FIG. 6, there is shown a representation of a SAW transponder, which is imbedded in an ignition key 26 and to which is connected a coupling coil 36. It should be noted that other coil or antenna configurations, such as dipole antennas, can also be used.

The transponder operates to convert a received signal to an acoustic wave and then to reconvert the acoustic energy back into an electrical signal for transmission via the coupling coil 36. The signal transforming element of the transponder includes a substrate of piezoelectric material, not shown, on one surface of which is deposited a layer of metal, such as aluminum, forming a 6-bit spatial pattern of electrodes or transducers shown in FIG. 6. In alternate embodiments, binary codes of more or less than six bits can be used. Moreover, the code itself need not necessarily be binary.

The piezoelectric substrate, not shown, is fabricated from YZ lithium niobate (LiNbO3). Other materials can be used for the piezoelectric substrate, such as PZT ceramic and PVDF polymers.

The aforementioned transducer pattern comprises two bus bars 62 and 64 connected to the coupling coil 36. A leading transducer 50 and a plurality of coding elements or tap transducers 52, 54, 56, 58, 60, 61 are also provided. These transducers are also known as interdigitated electrode arrays. The bus bars 62 and 64 define a path of travel, shown by arrow 66, for an acoustic wave which is generated by the leading transducer 50 and propagates substantially linearly, reaching the tap transducers 52–61, each in turn. The tap transducers 52–61 convert the acoustic wave back into electrical energy which is collected and therefore summed by the bus bars 62 and 64. This electrical energy then activates the coupling coil 36 and is converted into electromagnetic radiation for transmission.

In the preferred embodiment, the tap transducers 52–61 are provided at equally spaced intervals along the acoustic wave path 66. An informational code associated with the transponder can be imparted by removing a selected number of tap transducers 52–61. In alternate embodiments, delay pads, not shown, can be provided between tap transducers 52–61. They can be made of the same material as, and deposited with, the bus bars 62 and 64 and the tap transducers 52–61, each delay pad having a width sufficient to delay the propagation of the acoustic wave from one tap transducer 52, for example, to the next 54.

A major problem that is encountered with the SAW device described above is the existence of spurious signals. In the present context, the term spurious signal means unintended transponded signals that interfere with the correct interpretation. These spurious signal arise from two sources: (1) crosstalk and (2) double transit interference.

Referring to FIG. 6, a simple explanation for the intended operation of the SAW delay line is to imagine that an electrical excitation launches a SAW from main IDT 50. This wave 66 travels towards a set of subIDTs 52, 54, 56, 58, 60 and 61, each of which converts part of the SAW energy back to electrical energy. However, since all IDTs are interconnected, all IDTs both launch and receive SAWs. Crosstalk refers to output pulses created by launching and receiving SAWs within the subIDT structure, e.g., a SAW launched by subIDT 52 and received by subIDT 60.

Double transit interference refers to output pulses created by two SAW transits. For example, a SAW launched by main IDT 50 and received by subIDT 58 contributes to an output pulse; this output pulse excites the coil antenna 36 as desired. However, acoustic energy is also reflected from subIDT 54, and redirected and picked up by subIDTs 56, 54 and 52 as well as the main IDT 50. One may trace through a plethora of similar processes.

Cost and range considerations mandate the use of a reduced rf frequency, preferably below 50 MHz so that low cost electronic components developed for consumer electronics can be employed. Cost considerations also dictate reducing the number of electronic components, for example, phase detectors. This mandates amplitude encoding for the SAW device, for example using the presence of a pulse to indicate a binary 1 and its absence to indicate a binary 0. Such a coding scheme simplifies the detection and decoding electronics but introduces a higher vulnerability to spurious signals. Two factors, described below, limit the number of code bits available in a low-frequency amplitude encoded system.

1) Low frequency increases SAW wavelengths, thereby increasing the required width for a subIDT and limiting the number of subIDTs that can be incorporated on a reasonable size chip. For example, if the rf frequency is 44.3 MHz and the substrate is Y cut Z propagating lithium niobate, the SAW wavelength is 77 microns. If 10 periods are reserved for each code bit, then a maximum of 10 IDTs could be arranged on a 1 cm chip, reserving 1 mm at each end for acoustic absorbing material. If 5 of the first code positions are left blank, leaving room for one main IDT and 4 subIDTs in which to incorporate a code, as proposed by previous systems, this method permits $2^4$ or 16 possible codes, which is barely enough for an antitheft system.

2) The equivalent circuit for a SAW device is a capacitance in parallel with a resistance. It is well known to those skilled in the art of electronics that with a parallel capacitor-inductor-resistor circuit, the maximum response is obtained if the capacitance and inductance are in resonance; that is, the capacitance C and inductance L should satisfy the relation:

$$2\pi f(LC)^{\frac{1}{2}} = 1$$

where f is the operating frequency. Maintaining this equality for chips containing different codes requires that the number of IDTs on each chip be constant. In a phase-encoding method, this is automatic, since every bit is always "on"; only the phase is altered. In amplitude encoding, some bits, and therefore IDTs, are missing. Each IDT contributes to the overall SAW device capacitance. Maintaining constant capacitance therefore further limits the number of available codes. Using the example given above, a 4-bit code yields 16 distinct codes; a 4-bit code with the restriction that two bits are 1's and two bits are 0's yields only 6 distinct codes.

This set of restrictions on frequency (below 50 MHz), chip size (less than 1 cm chip length), and coding method (amplitude encoding) appears to lead to an unreasonably low number of distinct codes, rendering the system ineffective. The invention disclosed herein breaks this barrier by providing means to reduce spurious signal levels so that the prior method for reducing spurious signals need not be applied. The invention requires that the first two bits be zeroes. This increases the number of code bits to 7, yielding $2^7$ or 128 distinct codes. There are 21 distinct codes with exactly 2 bits "on"; 35 codes with exactly 3 bits "on", etc. These are enough codes for an effective antitheft system. However, this requirement necessitates a new method to reduce spurious signals.

Methods To Reduce Crosstalk

Again referring to FIG. 6, crosstalk originates from SAW energy launched by one code subIDT (e.g., that shown at reference numeral 52) and received by another subIDT (e.g., 56). It is preferred that this type of process yield a much smaller output signal than the same process involving the main IDT 50 and one subIDT. One method for accomplishing this, is physically locating subIDTs in different acoustical channels.[2] This method is effective but limited. In this method up to eight "tap transducers" or subIDTs may be connected in series with acceptable spurious signal levels. This may be true for phase encoding but it is not true for amplitude encoding. When amplitude encoding is used and only the first two bits are zero, only one subIDT can be used in each parallel acoustic track.

The invention disclosed herein permits the use of two or more subIDTs per acoustic track, and/or allows a designer to dispense with separate acoustic tracks altogether. The invention accomplishes this by four distinct techniques:

(1) Time Narrowing

Time narrowing weakens crosstalk signals relative to wanted code signals by using a narrower electrode width for the subIDTs than is used for the main IDT. The wanted code signals then results from launching and receiving SAWs with one wide and one narrow IDT; unwanted spurious crosstalk signals result from two narrow IDTs and are therefore weaker.

Figure 7:
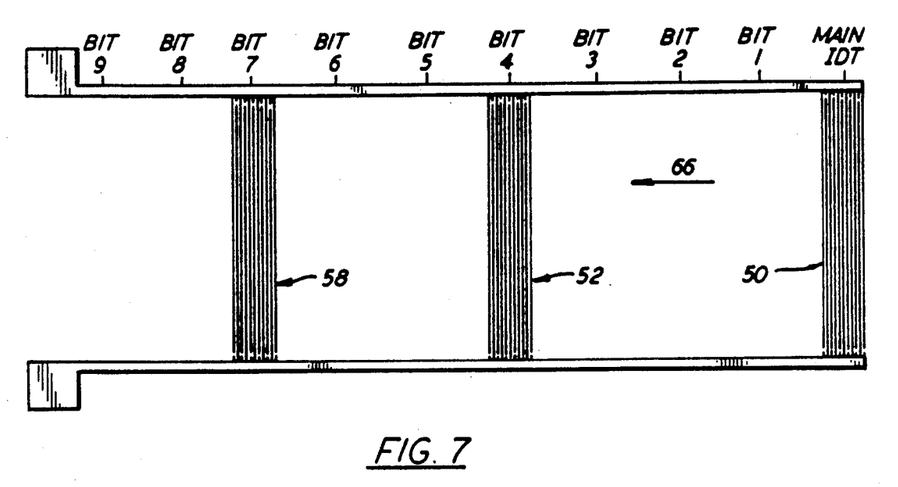
FIG. 7 is an enlarged plan view of a typical coded SAW device showing the electrode patterns.
Figure 8:
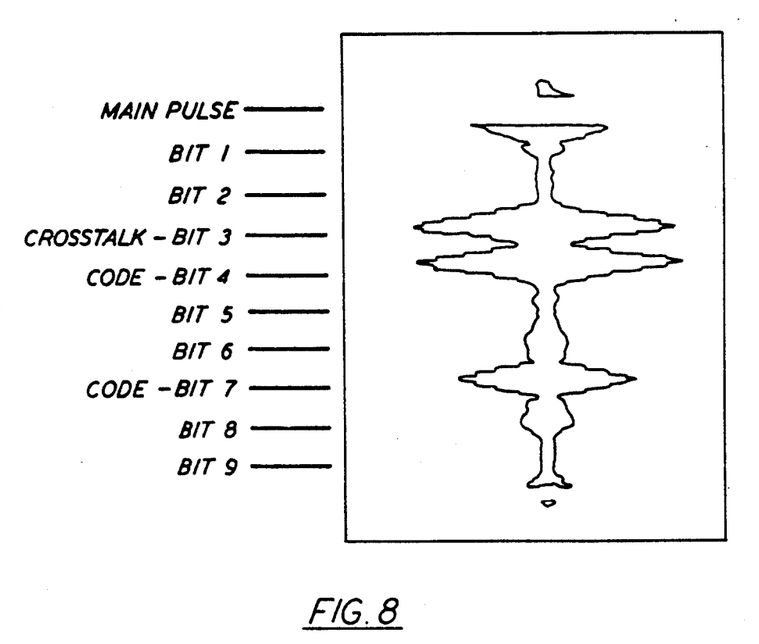
FIG. 8 is a diagrammatic representation of the electrical pulse signal produced by the coded SAW device of FIG. 7.

First consider FIG. 7, a standard amplitude-coded delay line with no compensation for spurious signals. The delay line has a main transducer 50 and two subIDTs. SubIDT 52 is positioned to yield an output pulse in bit position 4; subIDT 58, in bit position 7. Ideally, the output would consist of pulses in bit positions 4 and 7. In fact, because of crosstalk, there in an additional pulse in bit position 3. The electrical pulse output of a device made according to FIG. 7 is shown in FIG. 8. Note that the crosstalk pulse in bit position 3 has the same strength as the wanted code pulses in bit positions 4 and 7.

Figure 9:
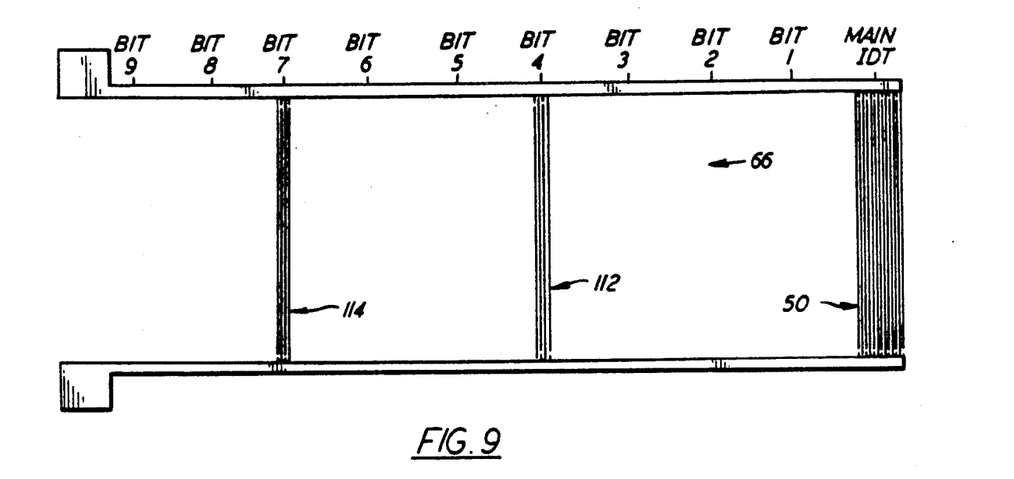
FIG. 9 is enlarged plan view of the coded SAW device of FIG. 6 having a narrowed electrode pattern.
Figure 10:
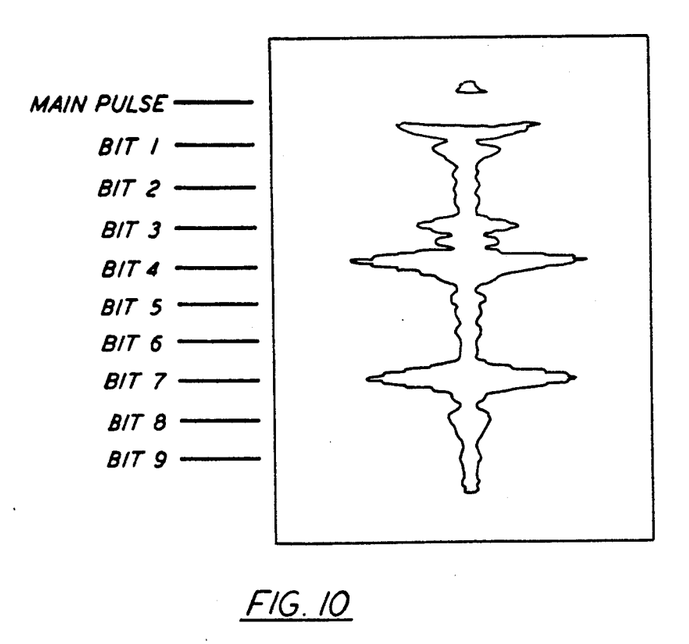
FIG. 10 is a diagrammatic representation of the electrical pulse signal produced by the coded SAW device of FIG. 9.

Now consider FIG. 9, a time-narrowed coded SAW delay line. Note how in comparison to FIG. 7, the subIDTs 112 and 114, respectively, have narrower electrode widths compared to the launch IDT 50. FIG. 10 presents the electrical pulse output of this device. Note how this spurious crosstalk pulse in bit position 3 is narrower in time as well as weakened with respect to the wanted code pulses in bit positions 4 and 7. Although this method is illustrated for a simple code with only two code bits "on", it is applicable to codes with more than two bits "on".

(2) Time Shifting

Figure 11:
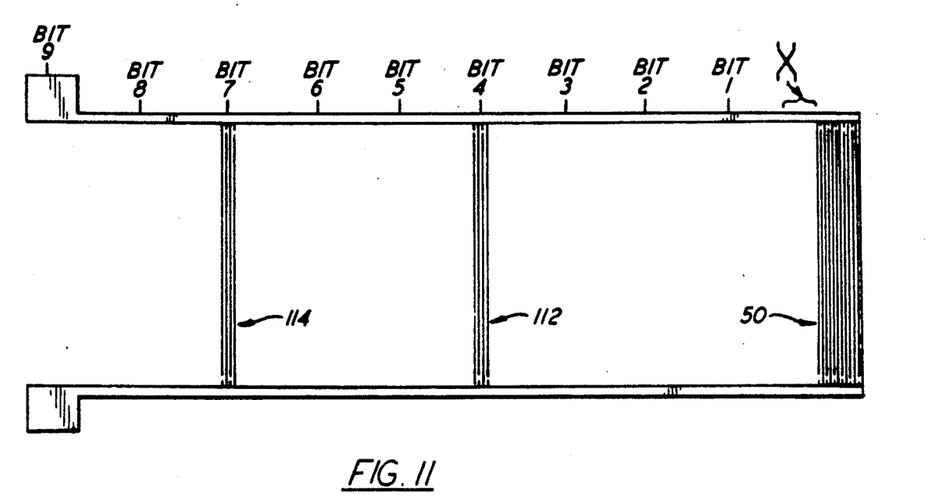
FIG. 11 is an enlarged plan view of the coded SAW device of FIG. 9 having the first tap transducer electrode displaced an additional bit length fraction from the launch transducer electrode.

If the antitheft system designer requires a higher immunity to spurious signals, it is possible to employ a second technique call time shifting. It is well known to those skilled in the art of electronic digital communications that one preferred method to read bit-serial codes is to read the codes at the time corresponding to the expected center or peak of the code-bearing pulses. Spurious signals occurring during the transition time in between pulses will have a far lower probability of interfering with reading the code, than spurious signals occurring during the center of the code-bearing pulses. It is possible to arrange for crosstalk spurious signals to occur during these transition times by adding a half code period or bit length X (FIG. 11) to the spacing between the main IDT and the subIDTs. If the subIDTs spacing is m operating frequency wavelengths, then the centers of the wanted code-bearing pulses occur at times $mT(n+\frac{1}{2})$, where T is the operating frequency period and n is any integer.

The spurious crosstalk pulses occur at times $mT(i)$, where i denotes an integer. This is illustrated in FIG. 12, which presents the electrical pulse output of the device illustrated in FIG. 11.

Figure 12:
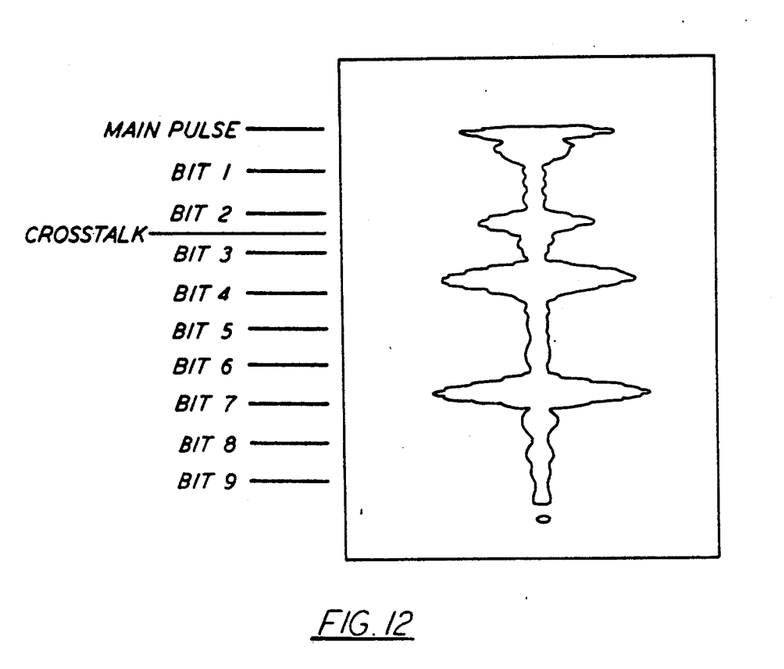
FIG. 12 is a diagrammatic representation of the electrical pulse signal produced by the coded SAW device of FIG. 11.

In comparing FIGS. 10 and 12, note that in FIG. 10, the spurious crosstalk signal occurs at the center of bit 3, while in FIG. 12 it occurs in between bits 2 and 3, thereby minimizing interference reading bits 2 and 3 correctly as binary zeroes. It has also been found useful to introduce a 90_ phase shift between the spurious crosstalk signals and the wanted code-bearing signals to ensure that spurious signals are in quadrature with wanted signals. This prevents spurious signals from diminishing the amplitude of wanted code-bearing signals, helping to prevent falsely reading a binary one as a zero. While this technique has been illustrated for a two-subIDT code, it is applicable to codes with a larger number of subIDTs.

(3) Time Spreading

Figure 13:
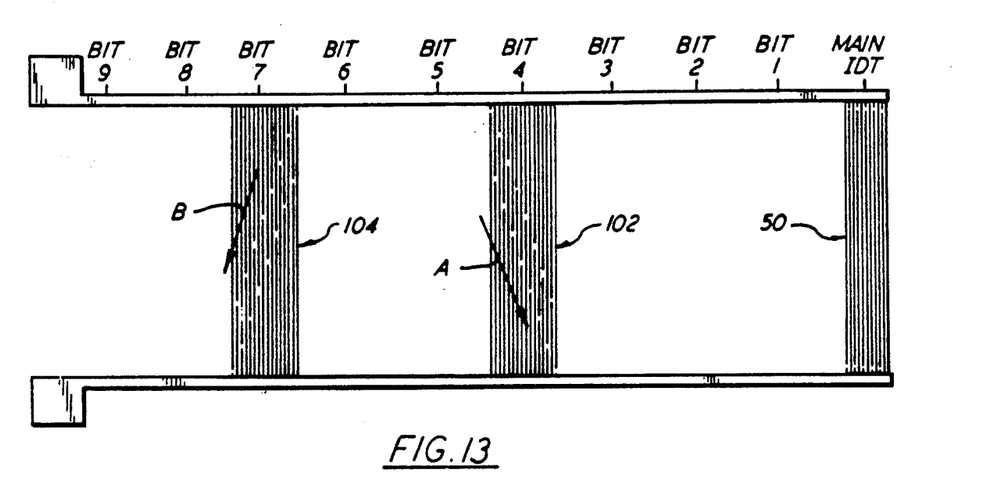
FIG. 13 is an enlarged plan view of a coded SAW device with tap transducer electrodes having patterns shaped in opposite directions with respect to each other.

Yet another technique to reduce crosstalk is to shape the pattern of electrode overlaps within the subIDTs to arrange that the crosstalk signals are spread over a longer period of time and to ensure that they are weaker than the wanted code-bearing signals. A method to accomplish this is shown in FIG. 13. SubIDTs 102 and 104 have shaped electrode gap patterns. The shaping is arranged in opposite directions (arrows A and B) for the two subIDTs. This causes the crosstalk pulse arising from SAWs launched from subIDT 102 and received by subIDT 104 (and vice versa) to be spread out over approximately twice as much time as main code-bearing pulses launched from main IDT 50 and received by subIDTs 102 and 104 (and vice versa).

Figure 14:
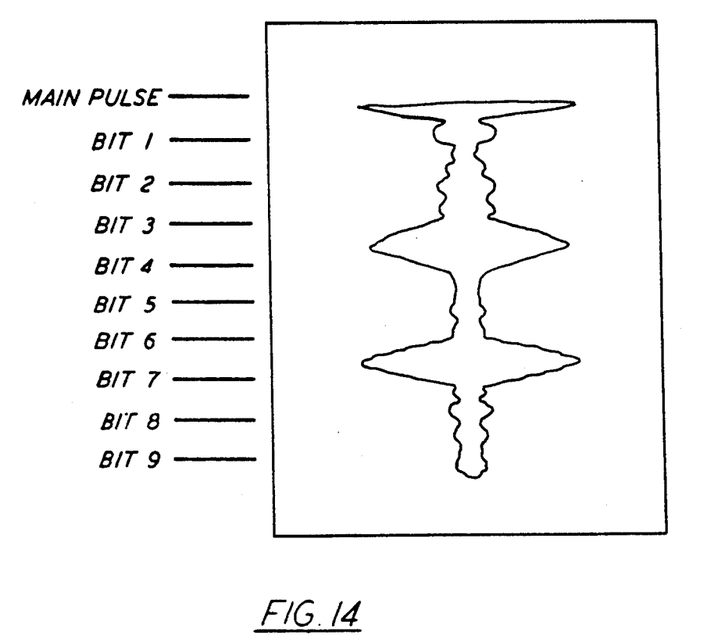
FIG. 14 is a diagrammatic representation of the electrical pulse signal produced by the coded SAW device of FIG. 13.

In addition, the crosstalk signals are weaker. This is illustrated by FIG. 14, which presents the electrical pulse output from a device fabricated in accordance with FIG. 13. Note that the spurious crosstalk signal in bit position 3 is both spread out in time and weaker than the wanted code signals in bit positions 4 and 7.

The time-spreading principle illustrated in FIG. 13 is applicable only when the number of subIDTs is limited to two, since a third subIDT would have to be shaped like one of the original two subIDTs. The method is still applicable to more than two subIDTs if it is arranged that the spurious crosstalk occurs at times outside the range of code-bearing pulse arrival times.

(4) Cancellation

Figure 15:
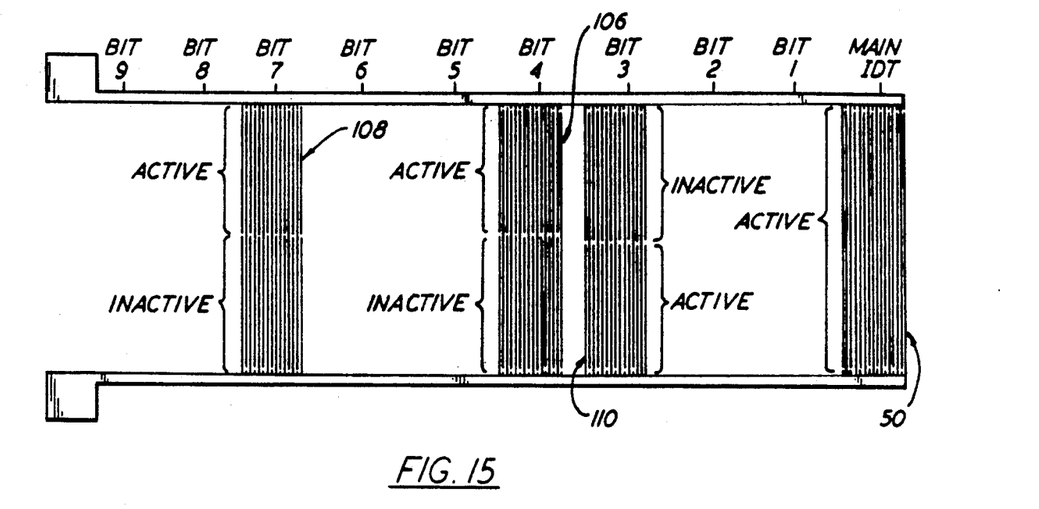
FIG. 15 is an enlarged plan view of a coded SAW device similar to that shown in FIG. 7, wherein an additional tap transducer has been added to bit position 3 in order to cancel the crosstalk pulse.
Figure 16:
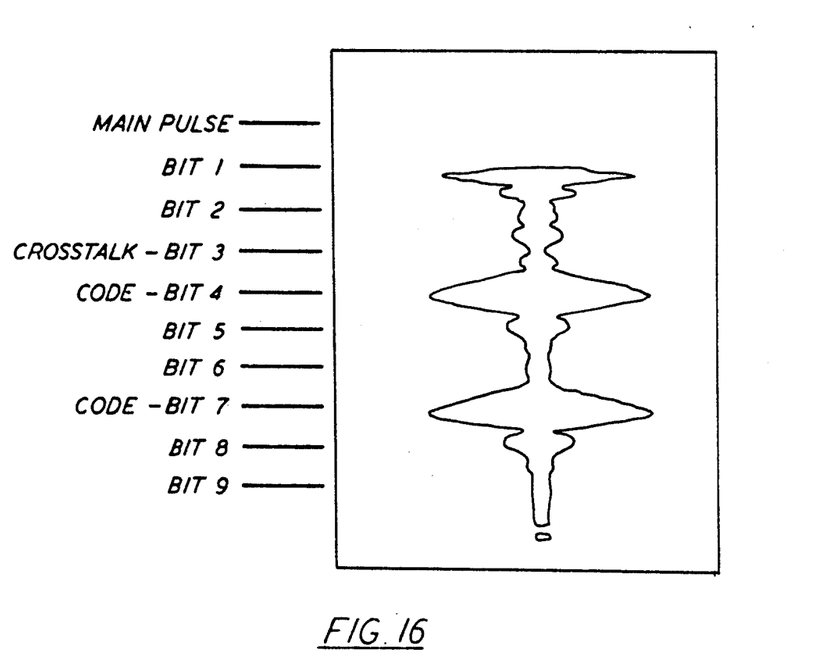
FIG. 16 is a diagrammatic representation of the electrical pulse signal produced by the coded SAW device of FIG. 15.

A fourth method for reducing spurious crosstalk signals is to add additional IDTs to the structure to generate additional signals of equal amplitude and time, and opposite phase, relative to the crosstalk signals. These additional signals then cancel the spurious signals. One way to arrange this is illustrated in FIG. 15. Careful inspection of the FIGURE will show that main IDT 50 and subIDTs 106 and 108 will produce wanted pulses at bit positions 4 and 7 and a crosstalk pulse in bit position 3. The interaction between additional IDT 110 and main IDT 50 produces a cancelling pulse in bit position 3. This cancellation is illustrated in FIG. 16.

There are many ways to produce this cancellation. For example, the main IDT 50 could have been arranged to be confined to the same acoustic track width as the subIDTs and the cancellation could have been accomplished entirely with additional subIDTs. Acoustic absorbing materials well known to those skilled in the art of SAW devices could be applied to acoustically isolate the additional IDTs from the main code IDTs and each other.

Methods to Reduce Double Transit Interference

As stated above, double transit interference arises from the reflection of acoustic energy by an IDT. Methods to reduce double transit interference rely on reducing this acoustic reflection and employ impedance mismatching.

It may be shown that, for a convention bidirectional interdigital transducer, the difference between reflection loss $L_{11}$ and transduction loss $L_{13}$ is $$L_{11} - L_{13} = 10 \log_{10}(2G_L/G_T)$$

where $G_T$ is the equivalent circuit conductance of the IDT, and $G_L$ is the load conductance, which includes both external load conductance and the conductance of other IDTs[3,4]. It is desired to arrange for $L_{11}$ to be as large as possible while minimizing increases in $L_{13}$. In accordance with the above equation, this may be accomplished by increasing the ratio $G_L/G_T$. There are several ways to do this, including the following two.

(1) Connect an external resistor. This may be done either by directly wiring a resistor across the SAW device or by terminating the pickup coil with a resistance. Through the transforming action of the two coils, a resistance connected to either coil will contribute to load conductance.

(2) Connect additional IDTs to the bus bars, but ensure that they do not interact acoustically with the code-generating IDTs. This may be done either by placement or by covering the added IDTs with acoustic absorber.

References

1. Cole, P. H., and Vaughan, R. (1972), "Electronic Surveillance System", U.S. Pat. No. 3,706,094.
2. Skeie, H., (1986), "Surface Acoustic Wave Passive Transponder Having Parallel Acoustic Paths", U.S. Pat. No. 4,620,191.
3. Smith, W. R., Gerard, H. M., Collins, J. H., Reeder, T. M., and Shaw, H. J. (1969), "Analysis of Interdigital Surface Wave Transducers by Use of an Equivalent Circuit Model", IEEE Trans. MTT-17, pp. 856-864.
4. Smith, W. R. (1973), "Minimizing Multiple Transit Echoes in Surface Wave Devices," Proc. 1973 IEEE Ultrasonic Symposium, pp. 574-577.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A security device for a motor vehicle that provides a coded surface acoustical wave which is converted to an electrical signal for comparison with a preset code, said security device comprising:
   a substrate having means defining an acoustical wave path; and
   a pattern of transducers disposed upon said substrate for providing said coded surface acoustical wave, including a plurality of spaced-apart tap transducers disposed along said acoustical wave path and operatively connected to a main transducer, at least one of said tap transducers is disposed upon said substrate to produce a signal pulse of opposite phase but approximately equal amplitude with respect to a crosstalk signal pulse in order to cancel same, and said pattern of transducers being further characterized by being operative to propagate acoustical waves in a relative direction towards and away from said main transducer to provide a bidirectional wave propagation with respect to said substrate.

2. The security device of claim 1, wherein all of said tap transducers have electrode widths that are narrower than the electrode width of said main transducer.

3. The security device of claim 1, wherein said tap transducers are serially disposed along said substrate, and further wherein each tap transducer defines a given bit position in said code.

4. The security device of claim 3, wherein a first of a series and closest tap transducer with respect to said main transducer is disposed no closer than at a third bit position therefrom, defined by at least three bit lengths.

5. The security device of claim 4, wherein said first of a series and closest tap transducer with respect to said main transducer is placed at a bit length distance from said main transducer that includes an additional fractional part of a bit length more than three bit lengths in order to reduce crosstalk.

6. The security device of claim 1, wherein said operating frequency is approximately less than 50 MHz.

7. The security device of claim 1, wherein said operating frequency is approximately less than 100 MHz.

8. The security device of claim 1, wherein at least one tap transducer has an electrode gap pattern of opposite direction to all of the other tap transducers on said substrate, in order to reduce crosstalk.

9. The security device of claim 1, further including a transmission coil operatively connected across said transducers.

10. The security device of claim 9, wherein an additional resistance is associated with said coil to increase load conductance in order to reduce double wave transit interference.

11. The security device of claim 1, wherein at least one tap transducer does not acoustically interact with the other tap transducers in order to reduce double wave transit interference.

12. The security device of claim 11, wherein the non-interacting tap transducer comprises an acoustic absorber for acoustically isolating aid transducer.

13. A security device for a motor vehicle that provides a coded surface acoustical wave which is converted to an electrical signal for comparison with a preset code, said security device comprising:
- a substrate having means defining an acoustical wave path; and
- a pattern of transducers disposed upon said substrate for providing said coded surface acoustical wave, including a plurality of spaced-apart, bidirectionally wave propagating, tap transducers serially arranged along said acoustical path and operatively connected to a main transducer, each tap transducer defining a given bit position in said code, and wherein at least one tap transducer is disposed to produce a signal pulse of opposite phase but approximately equal amplitude with respect to a crosstalk signal pulse in order to cancel said crosstalk signal pulse.

14. The security device of claim 13, further including a transmission coil operatively connected across said transducers.

15. The security device of claim 14, wherein an additional resistance is associated with said coil to increase load conductance in order to reduce double wave transit interference.

16. The security device of claim 13, wherein at least one tap transducer does not acoustically interact with the other tap transducers in order to reduce double wave transit interference.

17. The security device of claim 16, wherein the non-interacting tap transducer comprises an acoustic absorber for acoustically isolating said transducer.

* * * * *